United States Patent
Mathur et al.

(10) Patent No.: US 7,346,501 B2
(45) Date of Patent: *Mar. 18, 2008

(54) COMPRESSING MESSAGES ON A PER SEMANTIC COMPONENT BASIS WHILE MAINTAINING A DEGREE OF HUMAN READABILITY

(75) Inventors: Sharad Mathur, Redmond, WA (US); Gregory P. Baribault, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 258 days.

This patent is subject to a terminal disclaimer.

(21) Appl. No.: 11/040,548

(22) Filed: Jan. 21, 2005

(65) Prior Publication Data
US 2005/0187757 A1 Aug. 25, 2005

Related U.S. Application Data

(62) Division of application No. 09/781,823, filed on Feb. 12, 2001, now Pat. No. 7,010,478.

(51) Int. Cl.
*G10L 11/04* (2006.01)

(52) U.S. Cl. .................. 704/206; 704/9; 704/257; 715/531; 715/526

(58) Field of Classification Search ............. 704/1, 704/4, 5, 6, 7, 8, 9, 10, 206, 251, 257; 715/531, 715/526
See application file for complete search history.

(56) References Cited

U.S. PATENT DOCUMENTS

| 6,424,982 | B1* | 7/2002 | Vogel ................. 715/531 |
| 7,003,724 | B2* | 2/2006 | Newman .............. 715/526 |
| 2006/0089831 | A1 | 4/2006 | Mathur | |

\* cited by examiner

*Primary Examiner*—Huyen X Vo
(74) *Attorney, Agent, or Firm*—Workman Nydegger

(57) ABSTRACT

A text message is first parsed into its constituent semantic components such as header fields and body components. Then, different compression methods may be performed on each semantic component depending on the importance of the semantic component, the context of the semantic component, the characteristics of the semantic component, and whether or not the semantic component uses natural language expressions. For example, it is determined what compression method, if any, is to be performed on the semantic component. Each semantic component may be compressed individually. Since text compression takes the unique features of each semantic component into consideration rather than considering the text message as a monolithic text unit, a more intuitive text compression results.

13 Claims, 5 Drawing Sheets

COMPRESSING MESSAGES ON A PER SEMANTIC COMPONENT BASIS WHILE MAINTAINING A DEGREE OF HUMAN READABILITY

CROSS-REFERENCE TO RELATED APPLICATIONS

The present application is a divisional application of commonly-assigned U.S. patent application Ser. No. 09/781,823 filed Feb. 12, 2001 now U.S. Pat. No. 7,010,478, entitled "Compressing Messages on a Per Semantic Component Basis while Maintaining a Degree of Human Readability", and which is incorporated herein by reference.

BACKGROUND OF THE INVENTION

1. The Field of the Invention

The present invention relates to the field of compression technology. More specifically, the present invention relates to the compression of text messages on a per, semantic component basis while maintaining a degree of human readability in the messages.

2. Background and Relevant Art

Computing devices take a wide variety of forms. An early computer is often termed a "mainframe" computer system. These mainframe computers performed relatively simple processing tasks by today's standards, yet they were useful given the alternatives available at that time. One disadvantage of the mainframe computer was its a size and expense. Often mainframe computers occupied entire rooms and were so expensive that users were often forced to share time on the computer with many other users. Computers were, at that time, a scarce commodity.

As semiconductor processing technology developed, the personal desk-top computer became widely available. Desk-top computers are still available as one of many alternative computing devices available to consumers. Desk-top computers are advantageous over early mainframe computers because of their reduced size and expense. In addition, despite the reduced size and expense, the processing and memory power of conventional desk-top personal computers is much greater than their larger, more expensive, mainframe ancestors.

Currently, there are a wide variety of powerful computing devices available on the market. For example, lap-top computers, cellular and digital phones, personal digital assistants, and pagers may each have some degree of processing power and memory. Some of these devices are highly portable and each may have the ability to display information and receive information over a hardwired and/or wireless network. Thus, information is becoming increasingly available regardless of the location of the user.

One common form of information that is often displayed on this wide variety of computing devices is text. However, this wide variety of computer devices has a wide variety of screen sizes and resolution. Some devices such as cellular and digital telephones are very limited in the amount of text that can be displayed as compared to lap-top or desk-top computers. In order to increase the usefulness of the smaller screens in displaying text, often the text is compressed before display on the smaller screens. This compression is made while attempting to retain as much human readability of the text as possible.

However, sometimes, some areas of the text are characteristically more important to a reader than other areas of the text. The text may also have a certain semantic context within the message. Furthermore, the text may have a number of characteristics depending on location within the text message. For example, some text may flow naturally in natural language expressions (such as the body of an e-mail message), while other text does not (such as the From header in the e-mail message). However, conventional text compression technologies do not perform different compression processes taking these semantic issues into consideration. Therefore, what are desired are methods, systems, and computer program products for compressing text with more awareness of the semantic context of the text in the text message while retaining a degree of human readability of the message.

BRIEF SUMMARY OF THE INVENTION

In accordance with the present invention, a text message is compressed on a per semantic component basis. Examples of text messages include e-mail messages, task messages, meeting request/reminder messages, and meeting summary messages. Each of these messages has logically distinct semantic components such as header fields. For example, these header fields may include the message sender, message subject, and delivery time and date, among others. In addition, the body of an e-mail message may include a current message and a number of embedded messages that document a message exchange history that led to the current message. The current message and the embedded messages may each be considered semantic components of an e-mail message.

The text message is parsed into its corresponding semantic components. Parsing of header components in the current message may be accomplished by searching for well-known characteristics of headers. On the other hand, parsing of the message body into a current message and embedded messages is more complex. First, the parser scans the text message from the bottom up and finds a common prefix of non-alphanumeric characters among contiguous lines in the message body. Three or more contiguous lines that have a common prefix are determined to be a division that is a candidate for having one or more embedded messages contained therein. If the common prefix is not consistent throughout the contiguous lines, secondary confirmation is sought that would increase the probability that the division includes one or more embedded messages.

For each division, the parser then searches from top to bottom to identify any separators, such as "----- Original Message -----" that characteristically separates embedded messages. Specifically, for each line in the division, three or more contiguous non-alphanumeric characters are sought followed by text followed by three or more contiguous non-alphanumeric characteristics. If the candidate separator is a close, but inexact, match to these criteria, the separator may be classified as a weak separator in which case secondary confirmation may be sought. In addition, the parser may also look for other characteristics of a message break even if there are no separators. For example, the parser may search for two or more contiguous header lines and determine that a message break occurs immediately prior to the first header line even though there was no separator.

Once the message is parsed into embedded messages, all of the header lines for the embedded message are removed except for one that intuitively identifies the embedded message. For example, all headers but the From header may be removed from each of the embedded messages.

For at least some of the constituent semantic components, a compression method is then identified for use in compressing the semantic component. Then, the compressed component is included into the compressed text message.

Initially, all of the essential semantic components are compressed and truncated if they exceed a certain length. If the semantic component is a natural language component, they are compressed by natural language compression at a given a level. If there is still room below the size limit. The essential semantic components are not truncated. If there is still room, optional semantic components are added. If there is still room, the level of natural language compression is reduced.

Reducing the level of natural language compression may be accomplished by determining the character length of the message if compressed in accordance with a first set of compression rules. If there is more room, then the character length of the message is then determined if the message is compressed using a more lenient set of rules. The character length determinations are continued for increasingly more lenient compression rules until the message size finally exceeds a maximum size limit. At this stage, the method compresses the message using a set of rules that is at least as rigid as the last set of rules that resulted in the message size being within the maximum limit, but that is not as rigid as the set of rules that would result in an oversized message.

The principles of the present invention allow for the compression of a text message where the compression performed may be different from semantic component to semantic component. Thus, unique features, the degree of importance, the context, and language expressions of the semantic component are taken into consideration when adopting rules for compressing the semantic component. The end result is a much clearer and intuitive text compression for a given number of characters as compared to compressing the text message as a monolithic text unit.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
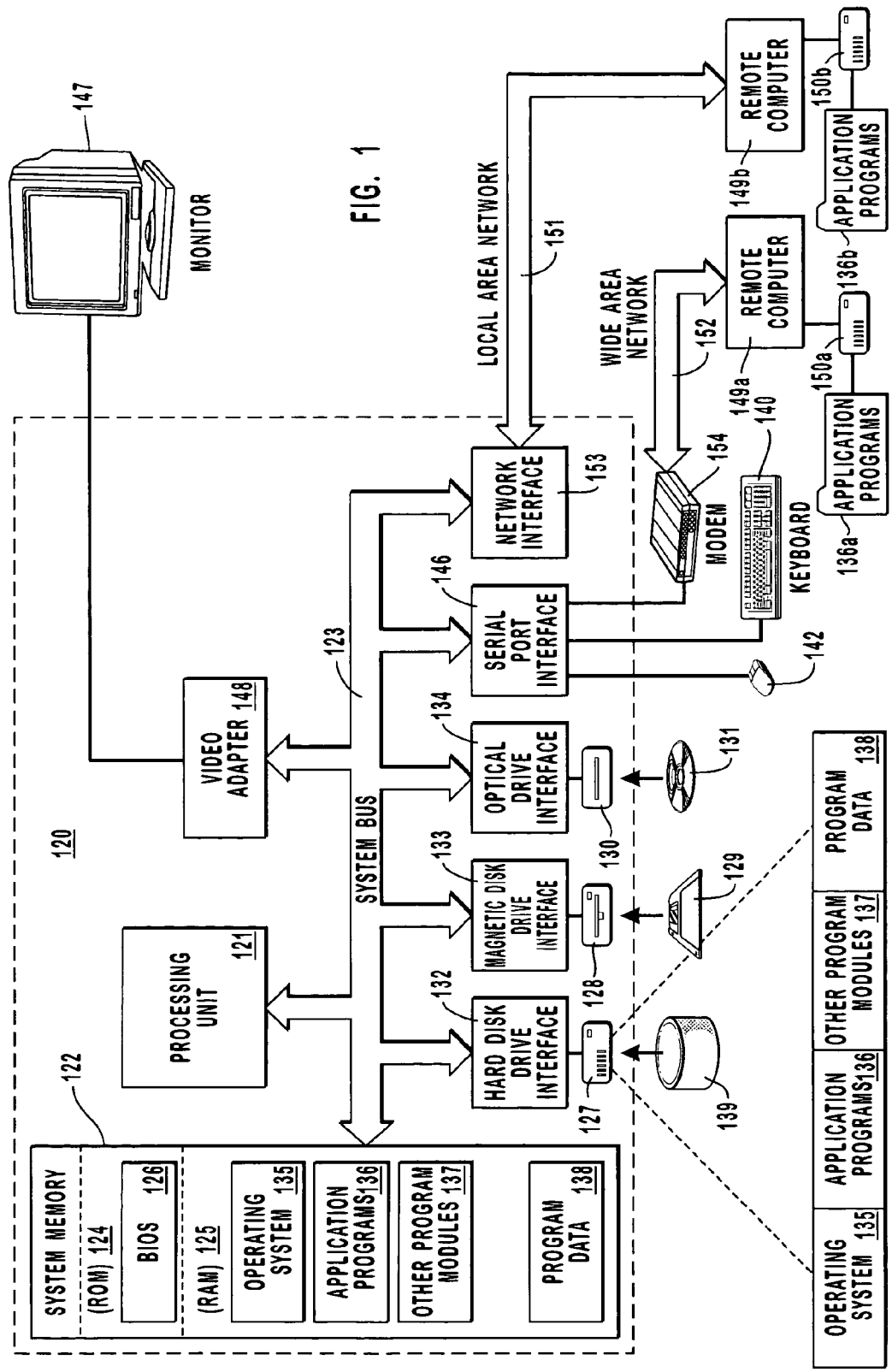
FIG. 1 illustrates an exemplary system that provides a suitable operating environment for the present invention.

The present invention extends to methods, systems, and computer program products for compressing text messages on a per semantic component basis while retaining a degree of human readability. Examples of text messages that have separate semantic components include e-mail messages, task messages, meeting request/reminder messages, and meeting summary messages.

A semantic component of these messages might include any logically distinct component of the message such as, for example, a header field in the current message, or body components of the message. For example, in an e-mail message, the To, From, Date and Subject headers of the current message may be individual semantic components. The body of the message may also have distinct components. For example, a typical e-mail message may include not just the most current message, but also several embedded messages that document the history of e-mail exchanges related to the current message. The current message and each of the embedded messages may each be considered to be semantic components of the e-mail message. In one example, the headers corresponding to the embedded messages are removed from each embedded message except for one (e.g., the From header) that intuitively identifies the embedded message. The remaining portions of each embedded message are then considered a semantic component. One aspect of the present invention relates to the parsing of the message body to obtain the current message and each of the embedded messages.

In order to compress the text message, the text message is parsed into its semantic components. For at least some of the semantic components in the text message, a compression method is identified for use in compressing the semantic component. Once compression is complete, the compressed semantic component is included in the compressed text message.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media, which can be accessed by a general purpose or special purpose computer.

By way of example, and not limitation, such computer-readable media can comprise physical computer-readable media such as RAM, ROM, EEPROM, CD-ROM or other optical disk storage, magnetic disk storage or other magnetic storage devices.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
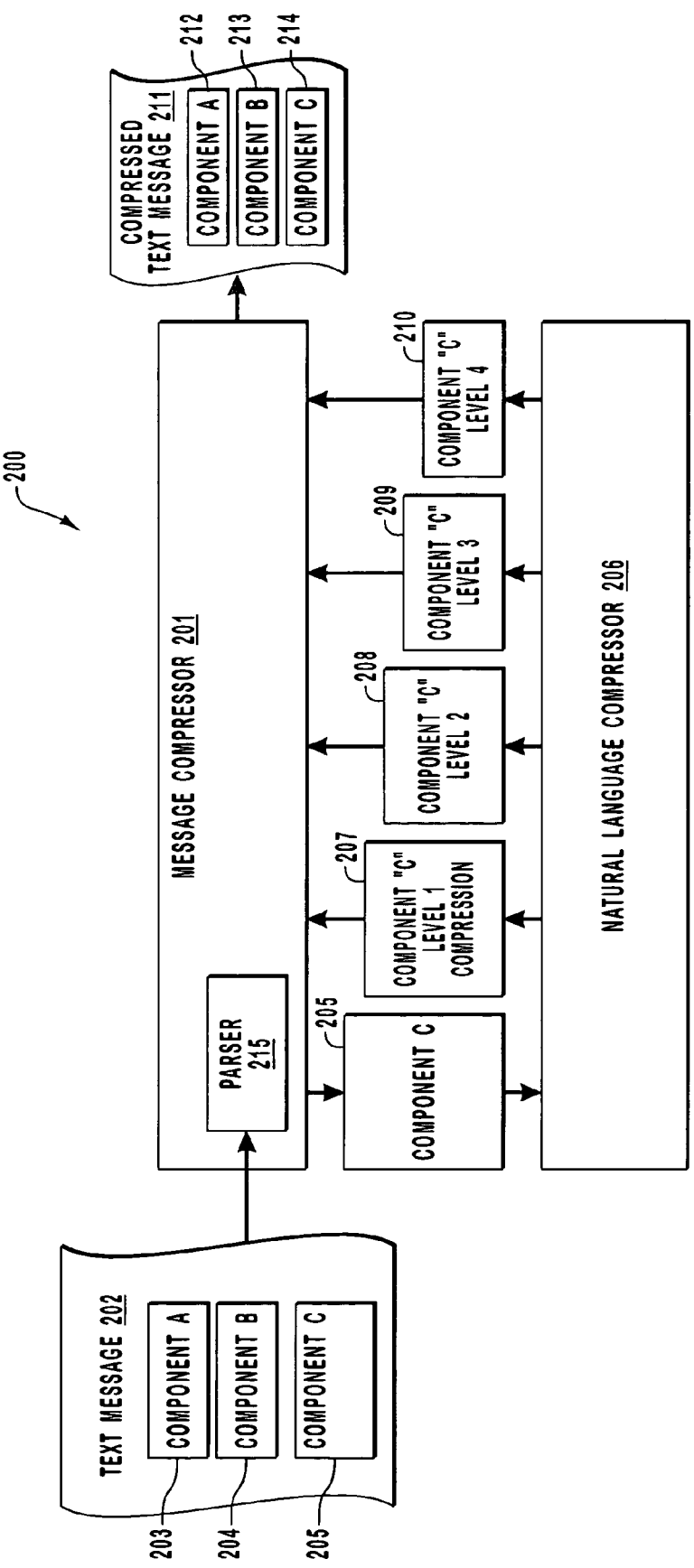
FIG. 2 is a schematic diagram of an architecture that performs text compression on a per semantic component basis in accordance with the present invention.

FIG. 2 schematically illustrates an architecture 200 in accordance with the present invention that performs text compression on a per component basis. Among other things, the architecture includes a message compressor 201 which receives a text message 202 having several semantic components. The message compressor 201 optionally uses a natural language component compressor 206 to form the compressed text message 211. The message compressor 201, the text message 202, the natural language component compressor 206 and the compressed text message 211 may comprise, for example, part of the program code means described above with reference to FIG. 1.

Figure 3:
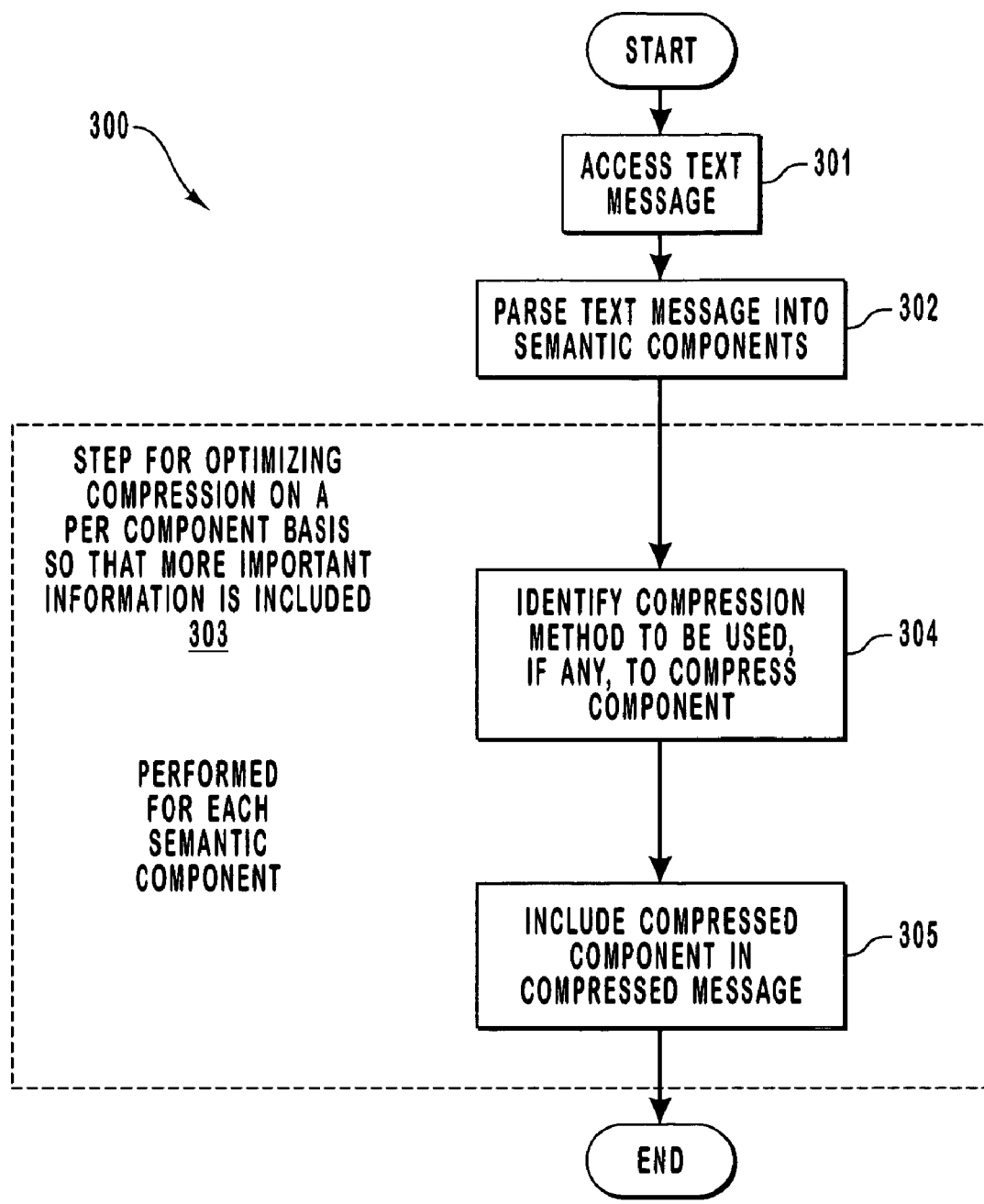
FIG. 3 is a flowchart diagram of a method of compressing text on a per semantic component basis in accordance with the present invention.

FIG. 3 illustrates a flowchart of a method 300 for compressing the text message on a per semantic component basis in accordance with the present invention. The method 300 of FIG. 3 may be performed by the architecture 200 of FIG. 2.

Accordingly, the description of the architecture 200 and of the method 300 will be interweaved with frequent reference to both FIG. 2 and FIG. 3.

In method 300, the text message is accessed (act 301). This is illustrated in FIG. 2 by message compressor 201 receiving the text message 202. The method compresses text messages on a per semantic component basis when a text message includes more than one semantic component. For example, the text message 202 includes three semantic components including component A (element 203), component B (element 204), and component C (element 205). Although these semantic components are represented generically in the text message 202 as elements 203-205, various specific examples of text messages and associated semantic components will be described herein.

As an initial example used to illustrate the principles of the present invention, suppose that the text message 202 is an e-mail message. Typical semantic components of an e-mail message would include a To header identifying the recipient of the message, a From header identifying the sender of the message, a Date header identifying the date and possibly the time of day that the message was sent, and a Subject header summarizing the content of the message. In addition, the current message in the body as well as any embedded messages may each be a semantic component of the text message.

After accessing the text message (act 301), the message compressor 201 parses the text message into its various semantic components (act 302). For example, a parsing component such as parser 215 may be used by the message compressor 201 to parse the various semantic components of the text message 202 including components A, B and C. Parsing of header fields is handled by searching for well-known characteristics of header fields. However, parsing of a body of a text message is more complex especially when a thread of e-mail messages is embedded in the body of an e-mail message. The parsing of the body of an e-mail message will be described in further detailed below.

After parsing the text message into semantic components (act 302), the method includes a step for optimizing the text compression on a per semantic component basis so that the more important information is included in the compressed text message (step 303).

Step 303 includes various corresponding acts 304 through 305, which will now be described. First, a compression method is identified for use when compressing the semantic component for inclusion in the compressed message (act 304). For example, the identified compression may include a specific level of compression performed on natural language semantic components, a custom compression technique, or a combination of both. It may even be that no compression at all needs to be performed on the semantic component. The compressed semantic component (or perhaps the entire original semantic component if it is not to be compressed) is then: included in the compressed text message (act 305). For example, compressed text message 211 generated by the message compressor 201 includes compressed components 212, 213 and 214 corresponding to components 203, 204 and 205 in the original text message 202.

Now described is the method for determining the level of compression to be performed on the semantic component. As mentioned above, examples of text message types that include semantic components include e-mail messages, task messages, meeting request/reminder messages, and meeting summary messages. Each of these text message types is listed in the following Table 1 along with corresponding semantic components.

TABLE 1

| Text Message Type | Semantic Component | Essential? |
|---|---|---|
| E-mail Message | Subject Header | Essential |
| | From Header | Essential |
| | Date Header | Optional |
| | Body (Current Message) | Essential |
| | Body (Last Embedded Message) | Essential |
| | Body (Other Embedded Messages) | Optional |
| Task Message | Subject Header | Essential |
| | From Header | Essential |
| | Start Date Header | Essential |
| | Due Date Header | Essential |
| | Percent Complete Header | Essential |
| | Body (Current Message) | Essential |
| | Body (Last Embedded Message) | Essential |
| | Body (Other Embedded Messages) | Optional |
| Meeting Request/ Reminder Message | Subject Header | Essential |
| | Date Header | Essential |
| | Location Header | Essential |
| | From Header | Optional |
| | Body (Current Message) | Essential |
| | Body (Last Embedded Message) | Essential |
| | Body (Other Embedded Messages) | Optional |
| Meeting Summary Message | Subject Header | Essential |
| | Time Header | Essential |
| | Location Header | Essential |
| | Tasks | Essential |
| | Subject | Essential |

Referring to Table 1, the semantic components for each message type are identified as being "essential" or "optional". The essential semantic components correspond to those semantic components that are most important to be included in the compressed text message. The optional semantic components correspond to those semantic components that are less important, but are desirable to include if there is enough room.

For example, for an e-mail message, it is essential that the Subject header be included since it is helpful in the essential function of summarizing the content of the e-mail message. The From header is essential since it identifies the sender, which is critical for a reader in evaluating the context and importance of an e-mail message. The current message in the body is essential because it is the primary content that is intended to be conveyed by an e-mail message. Also, the last embedded message in the body is essential since it provides critical context information in cases where the current message is a reply to another message. However, any earlier embedded messages are only optional since it is thought that the current message and the last embedded message should be sufficient to derive most of the context of the current message. The Date header is also considered optional since it is not critical to know to understand the e-mail message. Any semantic components that are not considered optional or essential, such as the To header in an e-mail message, are not illustrated in Table I since they are not to be included in the compressed text message.

Some semantic components include natural language text that includes language as a person would naturally speak it. For example, the body, subject, and task descriptions of a message typically include natural language expressions. On the other hand, headers other than the subject typically do not include natural language expressions. The natural language components of the text message may be compressed by a natural language text component compressor 206 (see FIG. 2). An example of a natural language component compressor is described in co-pending and commonly-owned U.S. Pat. No. 7,069,207, issued Jun. 27, 2006, and entitled "Linguistically Intelligent Text Compression", which is incorporated herein by reference in its entirety.

When provided to natural language component compressor 206, the natural language component compressor 206 returns the natural language component in four different versions 207 through 210, each version representing a different level of compression which will be called herein level 1 compression, level 2 compression, level 3 compression, and level 4 compression, respectively, in order of increasing compression. Level 0 compression is used to refer to no natural language compression at all. One of these versions of the natural language component may then be selected for inclusion in the compressed text message.

The type of compression that is to be performed on the semantic component depends on the type of the semantic component. The compression that may be performed will now be described for each semantic component listed in Table 1.

The Subject header is common throughout all the text message types and is considered to be a natural language component. Accordingly, the Subject header component of anyone of the text message types is passed to the natural language compressor as represented in FIG. 2 by the message compressor 201 passing component C (element 205) to the natural language component compressor 206. The natural language component compressor 206 then returns the four compressed versions (i.e., versions 207, 208, 209 and 210) back to the message compressor 201. The method for selecting one of these versions is described in further detail below with respect to FIG. 4.

The From header is common to the E-mail Message and Task Message text message types and is not considered to be a natural language semantic component. After all, it just lists the name of the sender. A customized compression is thus performed on the From header. For example, the user may elect to have the full last name and the first initial, the full first name and then the last initial, and so forth. The user may also elect to have the device search for a phone number for that name in a database and include that phone number in the From field.

Time-based semantic components such as the Date header, the Start Date header, the Due Date header, and the Time header are also not considered natural language components, and are thus not passed to the natural language component compressor 206. If the time-based component includes a start time, a start date, an end time, and an end date, and if the start and end dates are the same, then the dates are left out. If the dates are different, but the year is the same, the year is left out. If the date is within the next six months, the year is left out. In short, any implicit information is stripped out of time-based semantic components.

As for the Location header, any Uniform Resource Locators (URLs) are stripped out if the device that is to read the text message is a device that is not capable of navigating to a URL. For example, the device that reads the text message may be a digital telephone that lacks Web navigation functionality. The rest of the Location Header may be passed to the natural language component compressor 206.

The Task header may be considered a natural language component and thus may be passed to the natural language component compressor 206.

The Percent Complete header may be compressed by changing spelled out numbers to digits representing the number. Also, the text "percent" may be changed to the symbol "%".

The body is parsed into one or more logical sections. For example, in an e-mail message that includes a thread documenting the history of e-mail messages, the body may be parsed into separate messages within the thread. The body is considered a natural language element and thus the parsed sections from the body are passed to the natural language component compressor 206. The mechanism for parsing the body of a message is described in further detail below.

Each semantic component has a specified initial maximum size. For example, the Subject header has an initial maximum size that is proportional to a parameter called herein "MAX_SUBJECT". Each of the time-based semantic components has an initial maximum size that is proportional to a parameter called herein "MAX_TIMERANGESIZE". The From header has an initial maximum size that is proportional to a parameter called herein "MAX FROMSIZE". The Location header has an initial maximum size that is proportional to a parameter called herein "MAX_LOCATIONSIZE". The body has an initial maximum size that is proportion to a parameter called herein "MAX_BODYSIZE".

If the semantic component is not compressed using the natural language component compressor 206, then the initial maximum size of the compressed component is equal to the corresponding parameter. If the semantic component is compressed using the natural language component compressor 206, then the initial a maximum size of the compressed component is equal to the corresponding parameter if the natural language compression level is 0, 1 or 2. However, the initial maximum size is 80% of the corresponding parameter if level 3 compression is employed, and 60% of the corresponding parameter if level 4 compression is employed. Any compressed text beyond the initial maximum size is initially truncated. The following may be the values of the parameters:

MAX_FROMSIZE=32
MAX_LOCATIONSIZE=40
MAX_TIMERANGESIZE=24
MAX_SUBJECT=64
MAX_BODYSIZE=2048

If natural language component compression is not to be performed on a semantic component, the custom compression techniques described above are employed on that semantic component. However, if natural language component compression is employed, the level of natural language compression that is performed on the natural language component is determined by constructing one or more test compressed messages.

Figure 4:
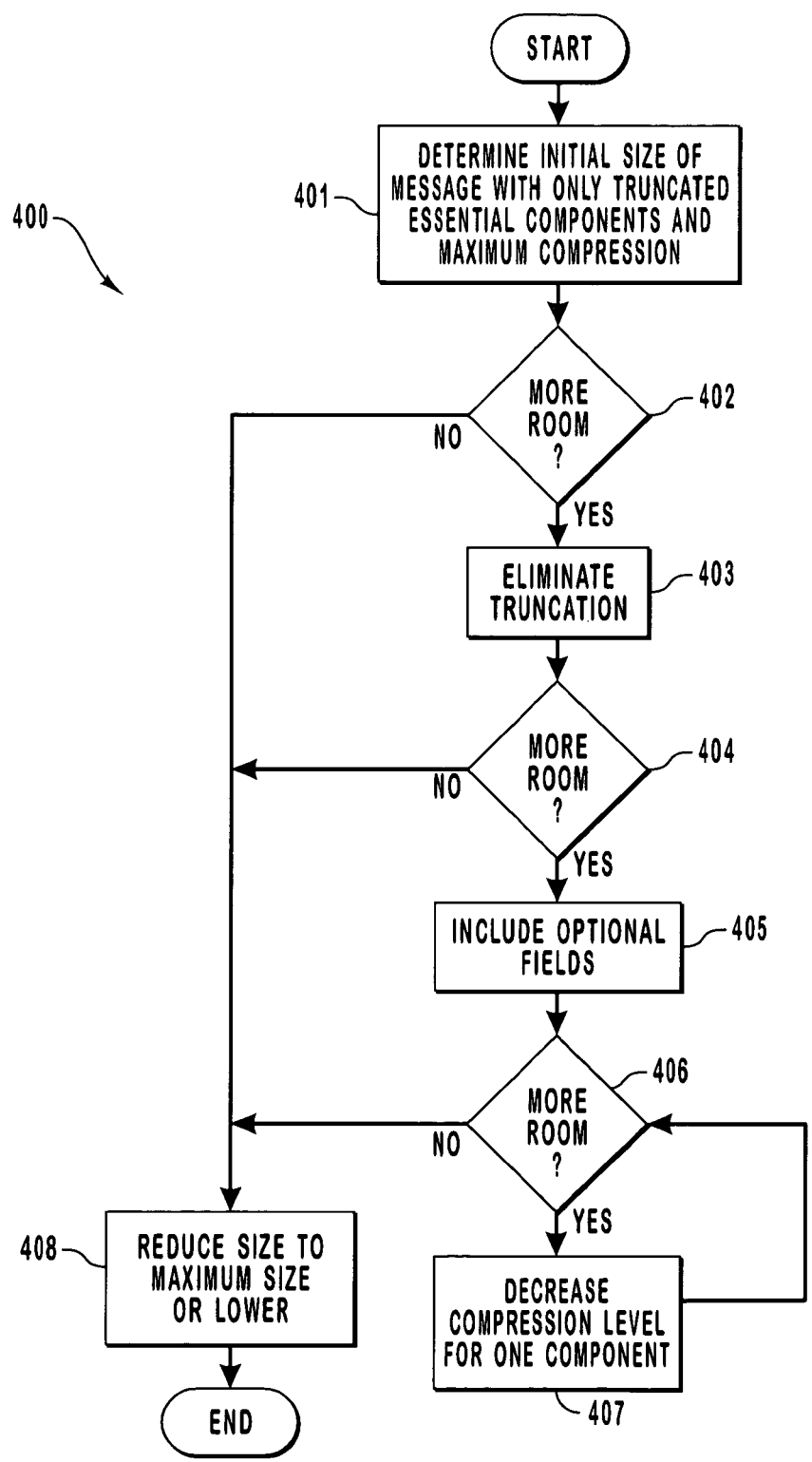
FIG. 4 is a flowchart diagram of a method of identifying a compression method to be used when compressing a semantic component.

FIG. 4 illustrates a method 400 for identifying a compression method to be used for each natural language component. The method will be described with respect to an example in which the user has indicated a maximum message fragment size of 160 characters with a maximum four fragments per message. Each text message may then include 640 characters. Also assume that the user has specified a maximum natural language compression level of 3. Perhaps the user may just have difficulty understanding semantic components compressed at level 4 natural language compression. Also, assume that the text message to be compressed is an e-mail message.

First, the initial size of the message is determined (act 401) where the message includes only those semantic components identified as essential, and where the essential components are truncated if they exceed the initial maximum size, and where natural language compression is performed at the maximum natural language compression level. The initial size of the message may be determined by actually constructing the message and then counting the number of characters. However, a lower processing method involves determining the number of characters in each semantic component and then adding these numbers for the total size. Each semantic component listed above for an e-mail message will now be evaluated to determine how a bare minimum test message would be created in the example.

The Subject header is considered essential and thus at least a compressed form of the Subject header is included in the compressed e-mail message. Since natural language component compression is employed at level 3 on the Subject header, the initial maximum size of the Subject header is 0.8*MAX_SUBJECT which is equal to 0.8*64.52 characters. If the non-compressed version of the Subject header were 100 characters, the level 3 compression version of the Subject header returned by the natural language component compressor 206 may be, for example, 67 characters. The last 15 characters of the compressed Subject header would thus be truncated to create a Subject header that is just 52 characters long.

The From header is also considered essential and thus compression is performed as described above for the From header. Natural language component compression is not employed on the From header and thus the initial maximum size of the compressed From header is equal to MAX_FROMSIZE or 32 characters. Suppose that the compressed From header size is only 14 characters long. All of the 14 characters are included in the compressed From header.

The Date header is only optional. Therefore, the date header does not contribute any characters to the initial size.

The current message and the temporally last embedded message in the body of the e-mail message are considered essential. These body components are compressed by natural language component compression. Since level 3 natural language compression is employed, the actual initial maximum size of the body is 0.8*MAX_BODYSIZE or 0.8*2048.1638 characters. Suppose the level 3 compressed form of the current message is 150 characters, and the level 3 compressed form of the last embedded message is 155 characters. The essential components of the body would thus be only 305 characters long. There would be no truncation of the compressed body.

In this example, the initial size of the message would be 52 characters for the Subject header plus 14 characters for the From header plus 305 characters for the essential portions of the body. The total size for the initial test message would thus be 371 characters. This is well within the 640 character limit set by the user. Thus, more of the text message may be sent (YES in decision block 402).

In order to fill this extra space, the size of the message is determined if truncation were eliminated from the message. In this example, the untruncated Subject header was 67 characters. On the other hand, the From header and the essential body components were within the initial maximum lengths and thus were not truncated. The size of the message would thus be increased by 15 characters to 386 characters in act 403 due to the adding back of the 15 truncated characters from the Subject header.

Since there is still room within the user specified maximum message size to increase the size of the test message (YES in decision block 404), the size of the message is determined if the message included all of the optional fields compressed at the maximum natural language compression level (act 405). Since this is an e-mail message, the only optional field is the Date field and any embedded messages temporally earlier than the last embedded message. Assume that there are two embedded messages in the body and that the optional embedded message is 180 characters long when compressed at level 3 compression. The date header is compressed as described above. Suppose that the compressed date is 15 characters. The message size would thus increase another 180 characters for the additional embedded message in the body and increase another 15 characters for the date header. The total increase by act 405 would thus be 195 characters. Thus, the size estimate would increase from 386 characters to 581 characters, still within the user specific maximum size (YES in decision block 406).

At this stage, the size of the message has been determined with all of the essential and optional semantic components included in the message in untruncated form and compressed at the maximum natural language compression level. Next, the compression level of each natural language oriented semantic component is reduced one at a time until either there is no longer enough room (NO in decision block 406), or the compression level has been reduced for all of the natural language oriented semantic components in the message. In the latter case, if there is still room, the compression level is further reduced one semantic component at a time until there is no longer any room available.

For example, there is more room available (YES in decision block 406) since the size of the message would only be 581 characters if the message was at the maximum natural language compression of level 3, with all semantic components (essential and optional) included and being untruncated.

Since there is still more room available, the compression level of one of the natural language semantic components is reduced to level 2. Suppose the Subject header is reduced to level 2 compression and that this would increase the Subject header from 67 characters to 79 characters. The total size of the message would thus increase by 12 to 593 characters. Since there is still room, the next natural language component size is reduced to level 2. The next natural language component is the current message. Suppose reducing the compression level increases the current message from 150 characters to 185 characters. The total size of the message would thus increase by 35 to 628 characters. There is still room, albeit only for 12 more characters.

Suppose that reducing the compression level for the next natural language component (i.e., the last embedded message) increases the last embedded message size from 155 characters to 190 characters. The total size of the message would increase by 35 to 663 characters, 23 characters more than the maximum (NO in decision block 406).

At this stage, it is determined what may be done to the message to reduce the size to at or below the maximum size of 640 characters (act 408). In this example, that may involve only reducing the compression level for some of the sentences in the last embedded message.

By gradually reducing the strictness of compression in this manner, the size of the test message is increased until the appropriate level of natural language compression is identified (act 304 of FIG. 3).

A method of compressing a text message on a per semantic component basis has been described. A method of parsing of the body of a message to extract messages that were embedded within the message body is now described. An e-mail message may contain a thread that includes the current message and one or more embedded messages that are contain within a message body. The following characters illustrate a message body that contains two embedded messages that document a history of e-mail messages.

25. Hello again Jack-
24. I'll bring the pail. But don't forget your ultra-grip running shoes. You know
23. how slippery the hill can get this time of year.
22. Jill
21. <cr>
20. #####-----Original Message-----
19. #####From: Jack
18. #####Sent: Saturday, Dec. 23, 2000 5:24 PM
17. #####To: Jill
16. #####Subject: RE: Hill Run
15. #####<cr>
14. #####Hello Jill-
13. #####Sure. Be sure to bring your pail.
12. #####Jack
11. #####<CR>
10. ##########-----Original Message-----
9. ##########From: Jill
8. ##########Sent: Saturday,#Dec.#23,#2000#5:23 PM
7. ##########To: Jack
6. ##########Subject: Hill Run
5. ##########<cr>
4. ##########Hello Jack-
3. ##########Are you still planning on taking a run up the hill? I'm
2. ##########running short on water.
1. ########## Jill This text appears as it would in the body of an e-mail except that, for clarity, line numbers are added, space characters that introduce a line are replaced with "#" characters, and a carriage return is marked with the characters "<cr>". In this example, the bottom-most embedded message is from Jill to Jack and is the temporally earliest embedded message in the thread. This will also be called the original embedded message and corresponds to lines 1 through 10. The embedded message above the original embedded message is from Jack to Jill and is a message that responds to the original embedded message. This will also be called the response embedded message and corresponds to lines 11 through 20. The upper-most message is the current message that responds to the response embedded message. This will be called the current message and corresponds to lines 21 through 25.

The current message and the temporally last embedded message are considered to be the essential messages in the body. Any embedded message other than the most recent embedded message is considered optional. Thus, the current message and the response embedded message are considered essential, while the original embedded message is considered optional.

Figure 5:
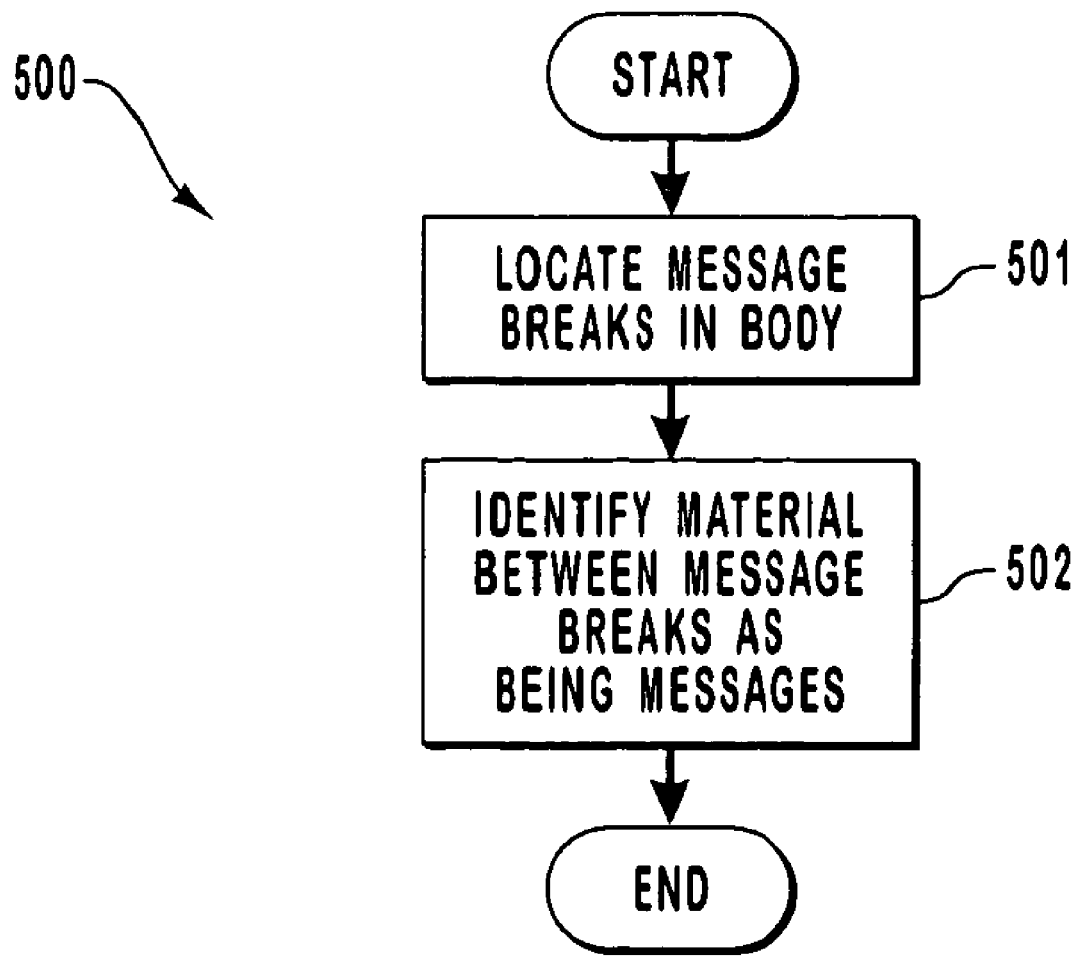
FIG. 5 is a flowchart diagram of a method of parsing a message body in accordance with the present invention.

FIG. 5 illustrates a method 500 of parsing the body into its component messages. First, the parser 215 locates message breaks in the body that are characteristic of separations between messages in the body (act 501). Then, the material from each message break to the next message break, if any, is identified as corresponding to an embedded message (act 502).

In order to identify the separators, the parser 215 first evaluates the message body in reverse, line-by-line to divide the body into divisions that are characteristic of including one or more messages. For each such division, the parser 215 then evaluates the division line-by-line from top to bottom to identify any messages within the division.

First, the parser 215 moves in reverse from bottom to top through the message. At the last line, the algorithm determines if there are any non-alphanumeric start characters in the line before the first alphanumeric character. The parser then moves up to the next line and determines the non-alphanumeric start characters for that line, and so on up preceding lines. If, starting at the bottom, more than three contiguous lines are found with the same non-alphanumeric start characters (e.g., ">>"), then the parser assumes that the start characters are common line prefixes that are used to indent an embedded message. The body parser continues to precede up the lines until a line is found that does not have the common prefix. Everything below that line is determined to be a division of the body.

In the above example thread, the non-alphanumeric start characters are ten space characters (each shown as "#") from line 1 until line 10. If the common prefix in the division extends down through the entire division as it does in the original embedded message of the example thread shown above, then the prefix is defined as a "strong" prefix meaning that the common prefix is a strong indicator that the division includes a message. If the common prefix in the division does not extend down through the entire division, then the prefix is determined to be a "weak" prefix meaning that the common prefix is a weaker indicator that the division does indeed include one or more messages.

Thus, if the division has only a weak prefix, the body parser searches for a secondary confirmation that the division includes a message. Such secondary confirmation may include looking at the first line in a division to determine whether or not the line is characteristic of a mail header. For example, a mail header may be characterized by text followed by a colon followed by more text. Secondary confirmation may also include looking at the first line in a division to determine whether or not the line is characteristic of a mail separator. For example, a mail separator may be characterized by a series of the three or more of the same non-alphanumeric characters followed by text followed by a second series of three or more of the same non-alphanumeric characters. If a division has a strong prefix or a weak prefix and a secondary confirmation, then the division is determined to be characteristic of including one or more messages.

In the above example thread, this process would determine that the ten space characters leading off lines I through 10 is a strong prefix and thus the method would identify lines 1 through 10 as corresponding to a division. The method would then proceed from lines 11 through 20 to identify the five space characters leading off each lines 11 through 20 is indeed a strong prefix and thus the method would identify lines 11 through, 20 as corresponding to a division.

For each division that is characteristic of including one or more messages, the body parser then removes any prefixes and evaluates that division, line-by-line, starting at the top of the division. The bottom division would then appear as follows:

10. -----Original Message-----
9. From: Jill
8. Sent: Saturday,#Dec.#23,#2000#5:23 PM
7. To: Jack
6. Subject: Hill Run
5. <cr>
4. Hello Jack-
3. Are you still planning on taking a run up the hill? I'm
2. running short on water.
1. Jill The top division would appear as follows:
20. -----Original Message-----
19. From: Jack
18. Sent: Saturday, Dec. 23, 2000 5:24 PM
17. To: Jill
16. Subject: RE: Hill Run
15. <cr>
14. Hello Jill-
13. Sure. Be sure to bring your pail.
12. Jack
11. <cr>

The body parser looks for a message separator or a message header which would indicate the beginning of a message. For each division, if the body parser finds a line that begins with a series of three or more of the same non-alphanumeric characters followed by text followed by a series of three of more of the same non-alphanumeric characters, then that line is determine to be a "strong" separator. However, if the line only begins with a series of three of more of the same non-alphanumeric text, then that line is determined to be a "weak" separator, and secondary confirmation is sought. Such secondary confirmation would include looking at the next line to determine if the line looks like a header line as when there is some text followed by a colon followed by more text. If a strong separator is found or if a weak separator is found with secondary confirmation, then that separator line is determined to be the beginning of a message.

Even if there is no separator found in the division, the body parser looks for other indications that there is a message break. For example, the body parser searches for contiguous lines that are characteristic of being a message header. A message header line may be identified by, for example, searching for a line in which there is a some text followed by a colon followed by some text. If more than one contiguous line of message headers is found, then there is determined to be a message break before the first contiguous line of message headers.

In the above example thread, both divisions begin with a line of characters "-----Original Message-----". This is indeed a line that begins with a series of three or more of the same non-alphanumeric characters (e.g., "-") followed by text (e.g., Original Message) followed by a series of three or more of the same non-alphanumeric characters (e.g., "-"). Thus, lines 10 and 20 are determined to be strong separators. There are no weak separators in either division. Also, it was not necessary to search for a message break using message header lines since separators existed for each message. Thus, each division as a whole is determined to be an embedded message. The current message and each of the stripped embedded messages are then considered to be a semantic component.

In this manner, the body is parsed into separate message components. If the message component had a header, then the parser looks for a header that identifies the message intuitively. For example, in the English language, the parser might look for the From header. The parser would then include that From header as part of the message component and remove all other headers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system having access to an email message having a message body containing one or more embedded messages that comprise part of an email thread corresponding to the email message, a method of parsing the embedded messages from the message body, the method comprising the following:
    an act of identifying one or more divisions within an email message body and that comprise part of an email thread, said act of identifying the one or more divisions including an act of locating message breaks within the email that are characteristic of separations between embedded email messages of a thread of email messages, and wherein said identification of the one or more divisions includes identifying a common prefix that is present in contiguous lines between the message breaks;
    an act of evaluating each of the one or more divisions to determine whether said one or more divisions contain an embedded email message; and
    an act of identifying the material between consecutive message breaks, corresponding to one of the divisions, as comprising an embedded message.

2. A method in accordance with claim 1, wherein the message body corresponds to an e-mail message and includes a plurality of embedded email messages.

3. A method in accordance with claim 1, wherein the common prefix comprises non-alphanumeric start characters that are present in the contiguous lines of a division.

4. A method in accordance with claim 3, further comprising the following:
    an act of removing the common prefix from the plurality of contiguous lines in the division;
    after the act of removing, an act of scanning each of the contiguous lines to detect any lines that begin with three or more of the same non-alphanumeric characters followed by alphanumeric characters followed by three or more of the same non-alphanumeric characters; and
    and act of determining that sections within the division that begin with any lines detected in the act of scanning are embedded messages within the message body.

5. A computer program product comprising a physical computer-readable medium having stored thereon computer-executable instructions for performing the method recited in claim 1.

6. A computer program product in accordance with claim 5, wherein the common prefix comprises non-alphanumeric start characters that are present in the contiguous lines of a division.

7. A computer-program product in accordance with claim 6, wherein the method further includes the following:
    an act of removing the common prefix from the plurality of contiguous lines in the division;
    after the act of removing, an act of scanning each of the contiguous lines to detect any lines that begin with three or more of the same non-alphanumeric characters followed by alphanumeric characters followed by three or more of the same non-alphanumeric characters; and
    and act of determining that sections within the division that begin with any lines detected in the act of scanning are embedded messages within the message body.

8. A method as recited in claim 1, wherein the method includes modifying at least one of the one or more divisions and performing additional analysis of said at least one division to determine whether said at least one division comprises an embedded email message.

9. A method as recited in claim 1, wherein said additional analysis includes looking at a first line in said at least one division and determining whether said first line includes a mail header.

10. A method as recited in claim 1, wherein said additional analysis includes looking at a first line in said at least one division and determining whether said first line includes mail separator characteristics.

11. A method as recited in claim 1, wherein the method includes progressively parsing the message from a bottom line to a top line.

12. A method as recited in claim 1, wherein said method further includes deleting only some of a plurality of identified headers within at least one embedded message.

13. A computing system having one or more physical computer-readable media storing computer-executable instructions for performing the method recited in claim 1.

* * * * *